United States Patent [19]

Pratt et al.

[11] Patent Number: 5,093,574
[45] Date of Patent: Mar. 3, 1992

[54] INFRARED SENSOR FOR SHORT RANGE DETECTION WHEREIN THE SUN MAY BE IN THE FIELD OF VIEW OF THE DETECTOR

[75] Inventors: Patrick D. Pratt, Shoreview, Minn.; Douglas B. Pledger, Medford, Wis.

[73] Assignee: Honeywell Inc., Minneapolis, Minn.

[21] Appl. No.: 629,294

[22] Filed: Dec. 14, 1990

[51] Int. Cl.$^5$ .............................. G01J 5/06
[52] U.S. Cl. .................................. 250/339; 250/342; 250/349
[58] Field of Search ............ 250/339, 342, 349, 203.1, 250/203.6

[56] References Cited

U.S. PATENT DOCUMENTS

| | | | |
|---|---|---|---|
| 3,940,753 | 2/1976 | Müller | 250/338.1 |
| 4,063,096 | 12/1977 | Roberts | 250/343 |
| 4,209,699 | 6/1980 | Puscn | 250/342 X |
| 4,318,089 | 2/1982 | Frankel et al. | 340/567 |
| 4,349,733 | 9/1982 | Beam et al. | 250/203.1 |
| 4,701,624 | 10/1987 | Kera et al. | 250/339 X |
| 4,710,630 | 12/1987 | Kuppenheimer, Jr. et al. | 250/349 X |
| 4,731,881 | 3/1988 | Geller | 455/619 |
| 4,737,028 | 4/1988 | Smith | 356/152 |
| 4,791,297 | 12/1988 | Savoca et al. | 250/347 |
| 4,849,620 | 7/1989 | Guerin et al. | 250/339 X |
| 5,001,348 | 3/1991 | Dirscherl et al. | 250/372 |

OTHER PUBLICATIONS

Dixon, "New Infrared System Tracks Missiles Against Bright Florida Sky", Electronics, Apr. 19, 1963, pp. 39-43.

K. Petri, A. Salik & J. Cooney, "Variable-Wavelength Solar-Blind Raman Lidar for Remote Measurement of Atmospheric Water-Vapor Concentration and Temperature", Defense Technical Information Center, pp. B-1 to B-7; Reprint from *Applied Optics*, vol. 21 pp. 1212-1218, Apr. 1, 1982.

Ralph J. Bondley, "UV Sensors for Operation at 1000° F.", General Electric Company, pp. 21-24, (1973).

P. J. Macar, J. Rechavi, M. C. E. Huber and E. M. Reeves, "Solar-Blind Photoelectric Detection Systems for Satellite Applications", *Applied Optics*, vol. 9, No. 3, Mar. 1970.

John W. Lowrance, "Ultra Violet Imager System", Final Report, Princeton Scientific Instruments, Inc.-/Air Force Geophysics Laboratory.

*Primary Examiner*—Constantine Hannaher
*Attorney, Agent, or Firm*—John G. Shudy, Jr.; Ian D. MacKinnon

[57] ABSTRACT

An infrared sensor for short range detection of aircraft wherein the sensor is designed to operate with the sun in the field of view yet still be able to track its target. The sensor operates on a spinning platform, wherein the spinning platform has precessional motion. The sensor has a first detector array for detecting the presence of the sun and other background clutter. The sensor further has a second detector array sensitive to radiation in a predetermined frequency band for tracking a specific target. The sensor has an objective lens to focus the radiation on the first and second detector arrays.

15 Claims, 7 Drawing Sheets

INFRARED SENSOR FOR SHORT RANGE DETECTION WHEREIN THE SUN MAY BE IN THE FIELD OF VIEW OF THE DETECTOR

The Government has rights in this invention pursuant to Contract No. DAAA21-88-C-0116, awarded by the Department of the Army.

FIELD OF THE INVENTION

This invention relates to infrared sensors for the detection of aircraft at a short range. Particularly, the invention relates to sensors having a large field of view (45°) and capable of operating with the sun in that field of view.

BACKGROUND OF THE INVENTION

Infrared sensors have been used commonly for the purpose of detecting and tracking targets which emit an infrared signal generated by a hot body or exhaust. One characteristic of infrared sensors is that they have difficulty tracking targets when the sun is in the field of view. As the sun is a black body, it produces radiation throughout the entire infrared band. Thus, when the sun is in the field of view, the infrared sensor will sense the sun's presence. As the sun's intensity is great, it commonly damages the detector focal plane.

A guard band filter can prevent the detector processor from tracking a false target. A guard band filter is used to reject an strong signal present from the sun or a flare.

One method that has been used to prevent damage to the detector is to restrict the sensor sensitivity in a wave length band where the sun's energy is reduced. One region that is commonly used for this purpose is the ozone ($O_3$) wave length absorption band, called the solar blind region which is between 0.265 $\mu$m and 0.275 $\mu$m. The ozone region is extremely useful because the sun's rays are attenuated in the ozone layer which is at an altitude between 20,000 and 40,000 feet. Thus, the sun's rays in this wave length band at the earth's surface are substantially attenuated and do not effect the detector. However, as ozone is not as prevalent in the atmosphere below 20,000 feet, the detector is still able to sense targets even at considerable distances.

Another method is to use a narrow band filter so the detector is sensitive to a specific wave band where the sun's rays are constantly attenuated yet the target signal is still present. For instance, the carbon dioxide emission bands from the IR signal of a hot aircraft jet exhaust at short range can be detected in the $CO_2$ absorption wave band which attenuates the solar radiation. This type of a device has been utilized at high altitudes with low IR attenuation to sense signals from known emitters which gives off a strong IR signal in a specific wave band. However, the distance that the sensor is operational at sea level is short since the IR signal is strongly attenuated.

SUMMARY OF THE INVENTION

The invention is an infrared sensor which is designed to track aircraft at a short range with the sun in the field of view. The sensor is mounted on a spinning platform, which has precessional motion, and continuously sweeps out a doughnut-shaped field of view. The precessional motion prevents the sensor from having the same element in the same position at each rotation. In this manner a single detector element is not damaged by repeated exposure to the sun's radiation. The infrared sensor itself comprises a first and a second array located in parallel wherein the guard band array being the first array sweeps through the target area first and, the target detect array sweeps through the target area second. The guard band array is sensitive in the wave length region from 1 $\mu$m to 4 $\mu$m and is used to locate and identify the sun's position. The target detect array is sensitive to approximately 4.3 $\mu$m. The target detect array has a pass band filter in the 4.3 $\mu$m $CO_2$ absorption region, so the sensor is capable of tracking the $CO_2$ exhaust emission from the aircraft. Further, the guard band array upon sensing the sun's position prevents the target detect array from tracking the sun. In this manner, the sensor is permitted to track targets with the sun within that field of view.

PREFERRED EMBODIMENT OF THE INVENTION

Figure 1:
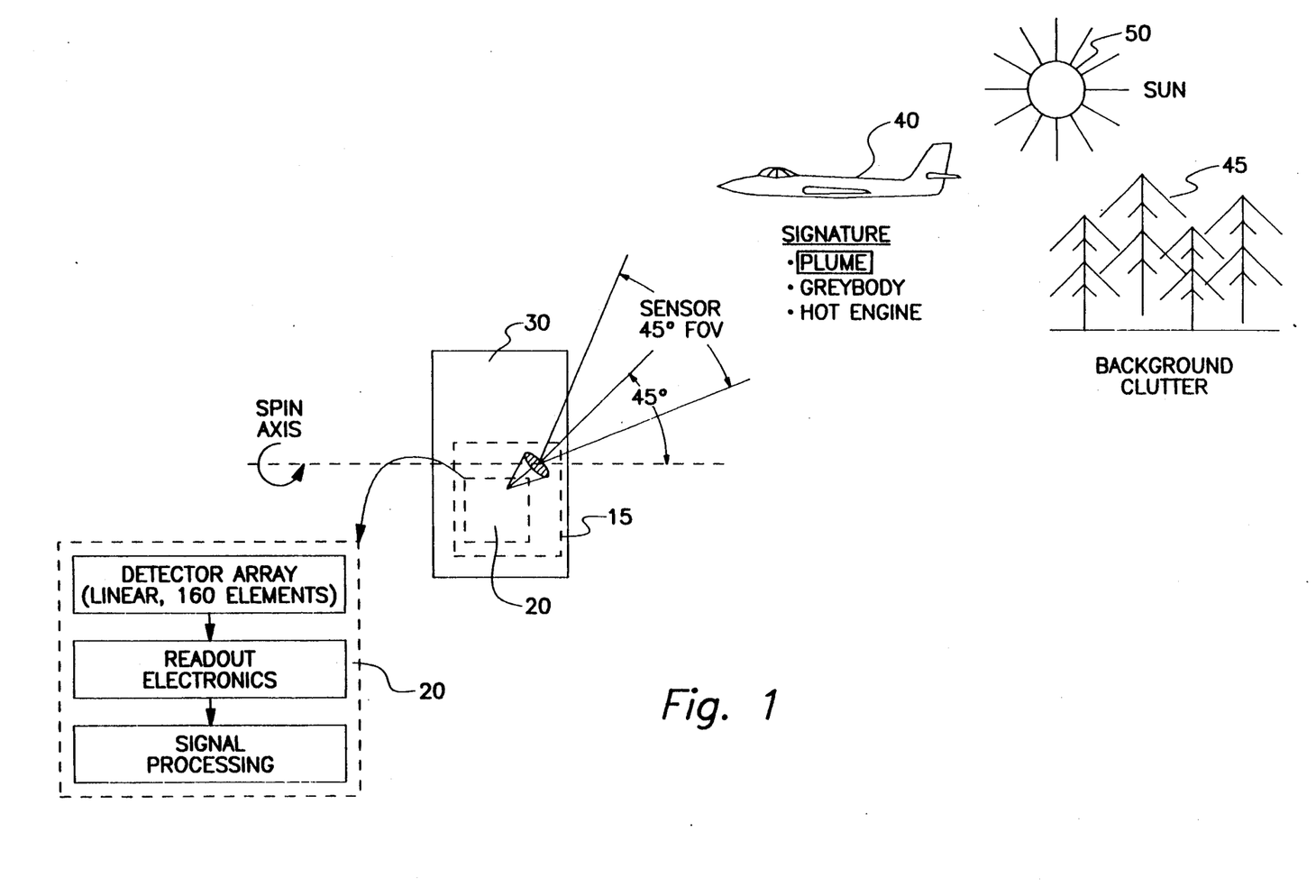
FIG. 1 illustrates the environment in which the infrared sensor must operate.

FIG. 1 demonstrates the environment which the sensor operates within. Sensor 15 is located within platform 30 such that sensor 15 has a doughnut-shaped field of regard, sensor 15 sweeps through the entire doughnut-shaped field of regard each revolution of platform 30. Platform 30 has some precessional motion while it is rotating. In this manner the elements of sensor's array (not shown) will not focus on the same image on two successive revolutions.

Sensor's 15 field of view shall include the target with background clutter which shall include trees and sun 50. The optimum target signature that sensor searches for is the exhaust from an aircraft 40. However, sensor 15 will also pick up black body radiation from hot engine components.

A central processing unit 20 (CPU) is utilized to process the sensor information. The CPU 20 processes the information by comparing the data provided from both guard band array 210 and target detect array 220 of FIG. 2. The manner in which the information from the two arrays is compared is described later in the specifications.

Figure 2:
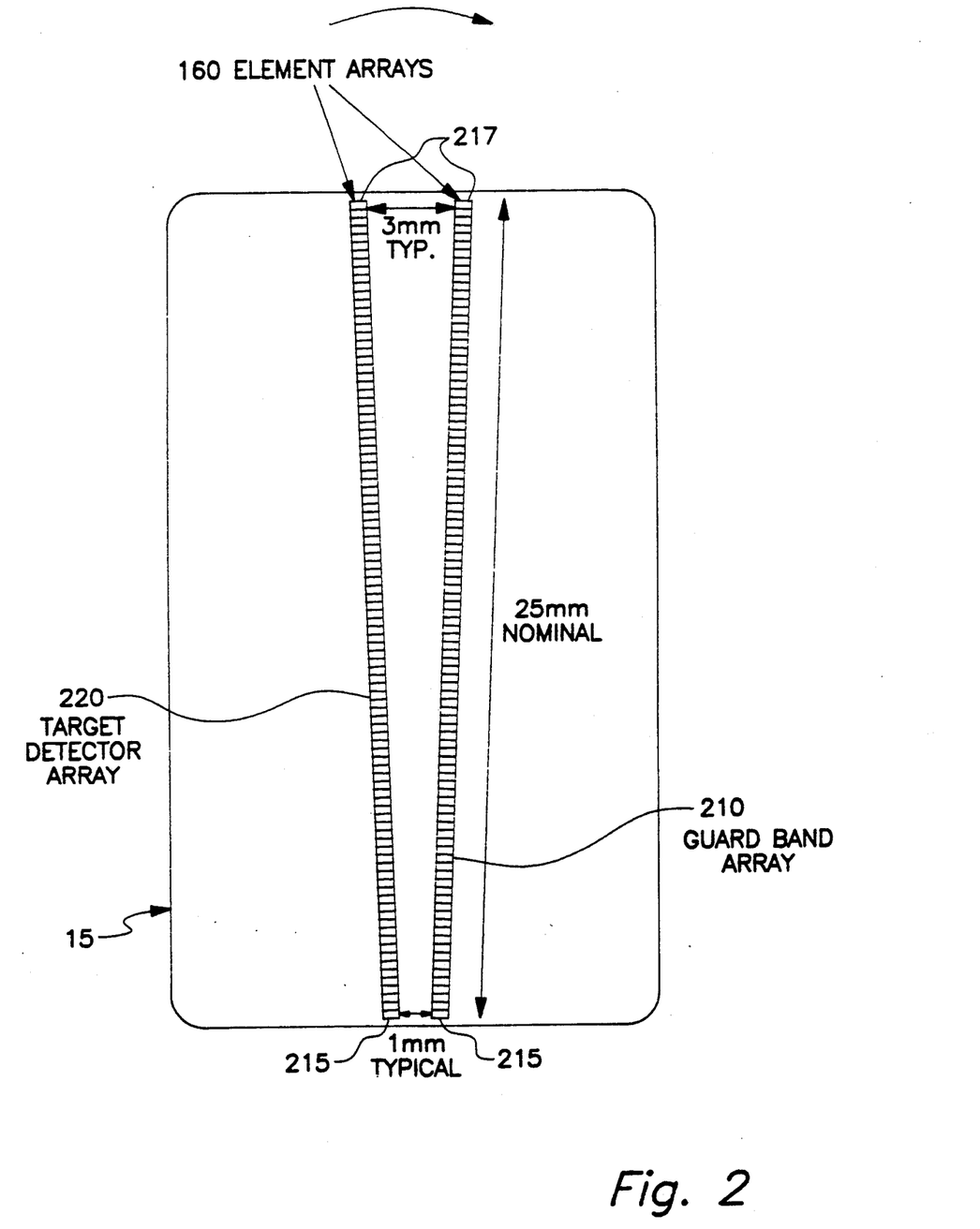
FIG. 2 demonstrates the placement of the two 160 element arrays in the sensor.

FIG. 2 shows the placement of the 160 element arrays 210 and 220. Sensor 15 incorporates a guard band array 210 and a target band array 220. Each array is comprised of 160 elements. The guard band array 210 is positioned such that guard band array 210 leads target detect array 220 as the platform (not shown) rotates. Both guard band array 210 and target detect array 220 are in the same plane. Therefore, if one of the elements of guard band array 210 should detect the sun, the similar element on target detect array 220 will be prevented from tracking a false target. Each array has a 43% fill factor and is equipped with a binary field micro lens array (325 of FIG. 3) which will approximately quadruple the effect of energy collection area of each element. The overall array length is 2.5 centimeters and the detectors are aligned in the radial planes of rotation of the platform with inner ends 215 separated by 1 millimeter and outer ends 217 separated by 3 millimeters. The resulting angle of separation between the arrays is approximately 4.5°. The linear arrays will be hard wired to a multiplexer or CCD readout for scanning capability. Each array completes a sweep every 50 milliseconds. Both the guard band array 210 and the target detect array 220 can be purchased from Cincinnati Electronics Corp., Mason, Ohio.

Figure 3:
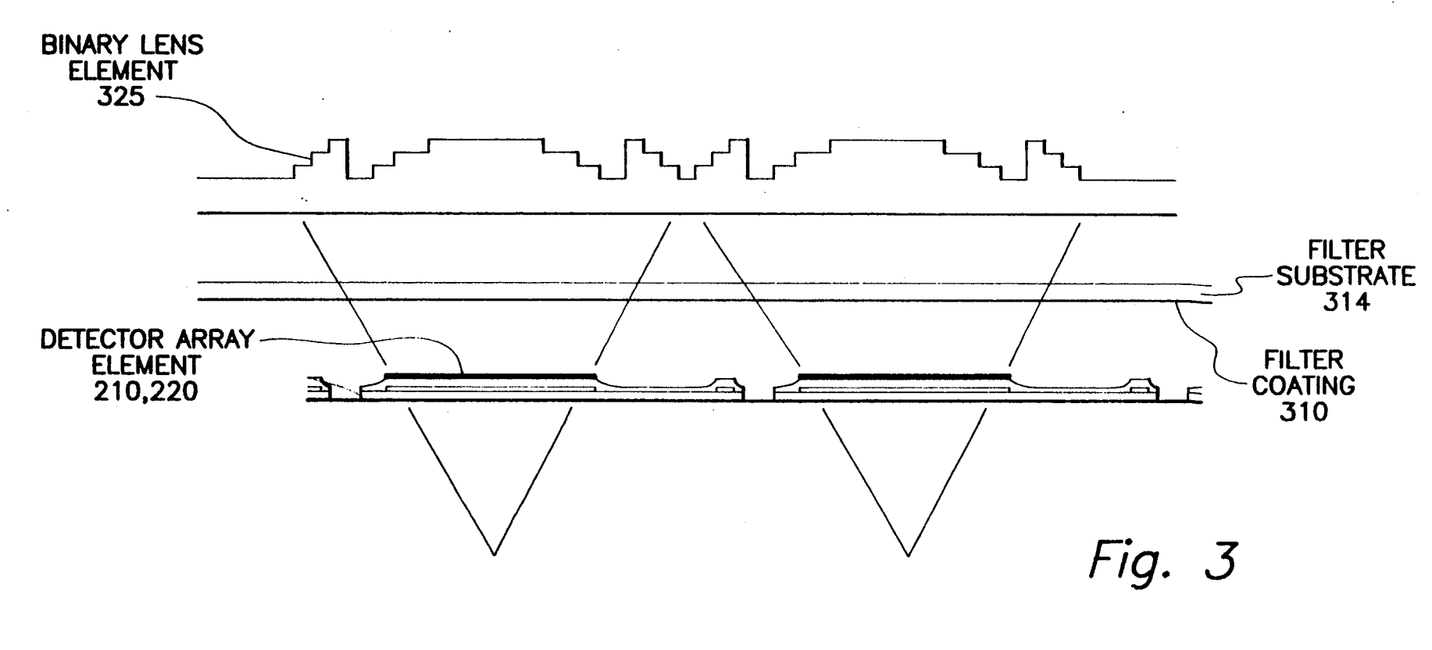
FIG. 3 illustrates the placement of the binary micro lens array and the filter with respect to the detector array.

FIG. 3 shows the placement of a binary field micro lens element 325, a filter substrate 314 and filter coating 310 relative to detector array 210 and 220. There are several important considerations in choosing the placement of the filters. They must be close enough to the sensor arrays to assure no crosstalk between transmitting bands. For this embodiment substrate 314 is inserted with filters coating 310 immediately adjacent to the detector array. The second surface of substrate 314 holding the filters should be antireflection (AR) coated for 4.2 μm.

Guard band array 210 is utilized to prevent false signals. Guard band array 210 is designed to have filter 310 pass energy from 1 μm to 4 μm. Such a filter is fabricated by depositing alternate low and high index of refraction materials according to the following design:

$$\text{substrate:} \left( \frac{H}{2} L \frac{H}{2} \right)^n : \text{air}$$

where H and L are quarter wave optical thicknesses of the high and low index materials respectively, and n is an integer representing the number of periods to be deposited. There are many materials that could be used for a short wave pass band filter with long wave edge at 4 μm. For this embodiment germanium is used for the high index ($n \approx 4$) and ZnS for the low index ($n \approx 2.2$).

Figure 4:
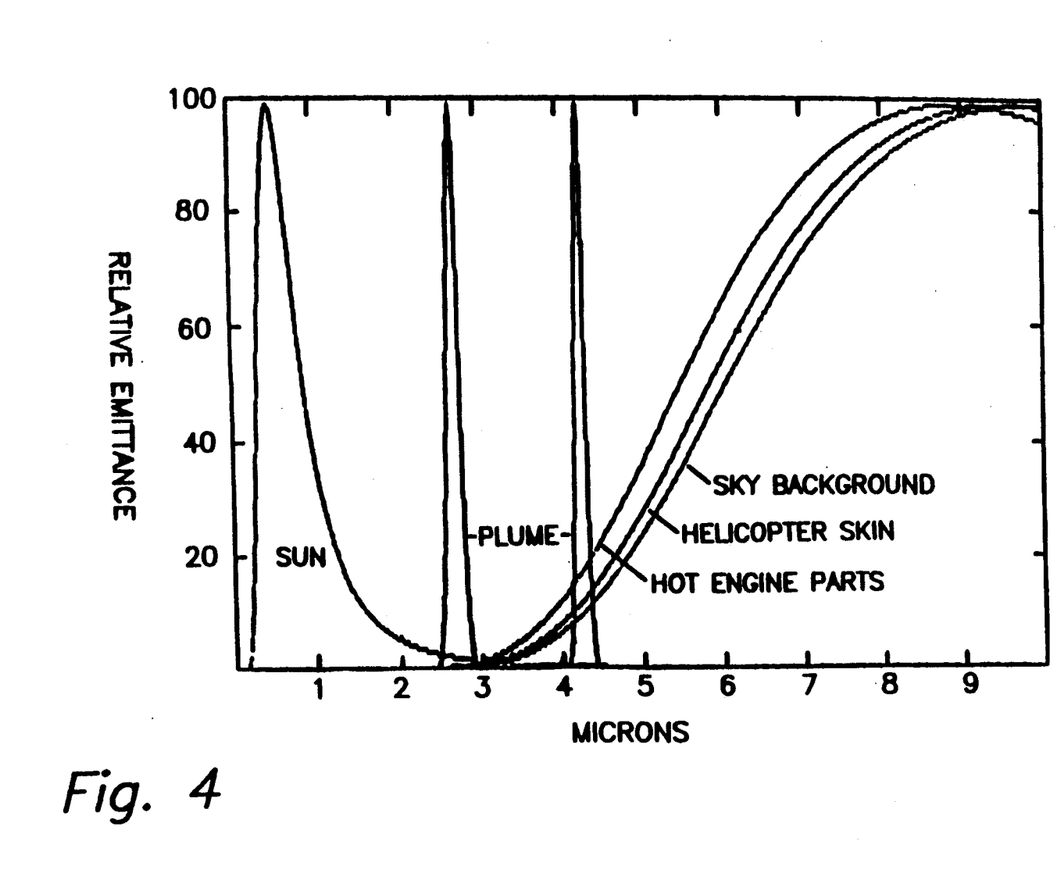
FIG. 4 illustrates the sun and background clutter radiance versus the radiance of an aircraft's body and exhaust plume.
Figure 5A:
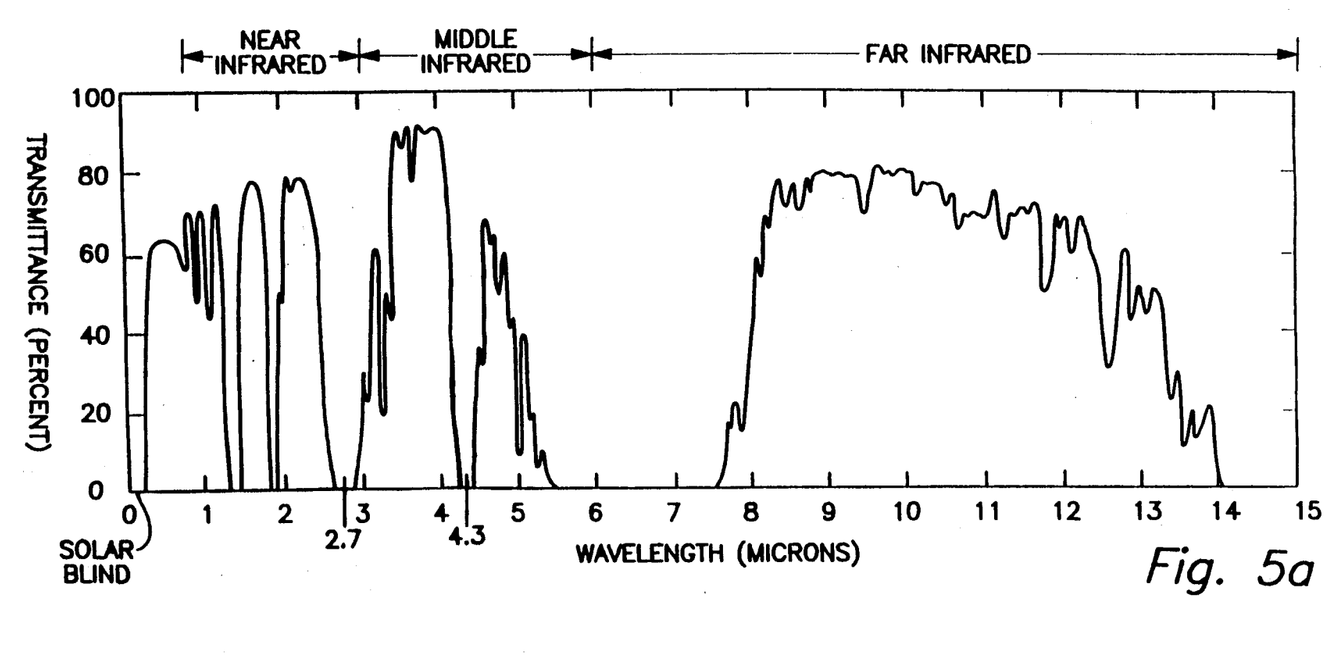
FIGS. 5a and 5b show the different absorption bands versus the percent transmittance of the sun's radiation.

The target detector array 220 is designed to have a filter 310 which will pass energy in the region from 4.2 μm to 4.3 μm. The pass band region for the target detector array filter 310 was calculated based upon data represented in FIGS. 4 and 5. FIG. 4 shows the background and target emissions produced by the sun and the exhaust plume. It should be noted that the sun's black body emission is reduced above 3 μm wave length while the $CO_2$ emission produced by the target plume is strong at 2.7 μm and 4.3 μm. FIG. 5a shows solar attenuation at sea level over a range of wave lengths from zero to 15 μm. Again, it should be noted that at 2.7 μm and 4.3 μm the atmospheric transmittance is approximately zero.

Figure 5B:
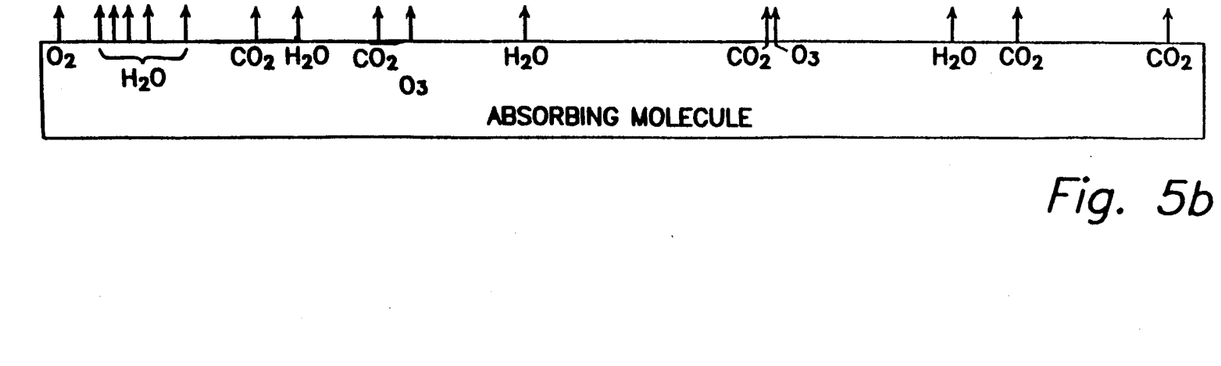

FIG. 5b shows the absorption wave bands of common atmospheric molecules including $CO_2$. By superimposing the absorption wave band of FIG. 5b on FIG. 5a it should be noted that the $CO_2$ absorption band lies directly over the 4.3 μm wave length. Therefore, the wave length of 4.3 μm has been chosen as the primary detection wave length since the solar radiation is significantly attenuated, yet the energy from the heated $CO_2$ exhaust is detectable at the edges of the $CO_2$ absorption band.

Figure 6:
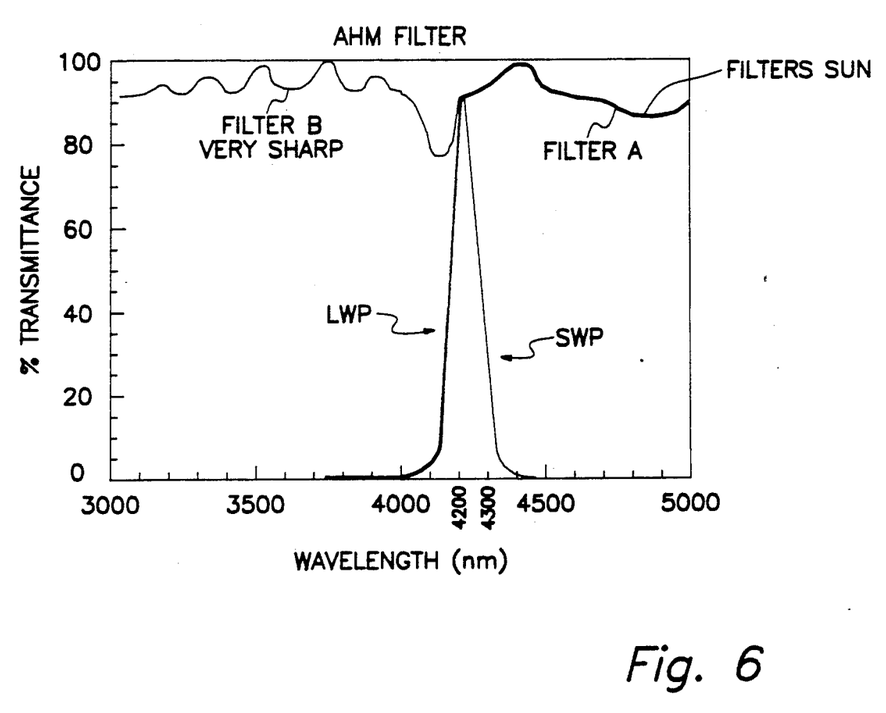
FIG. 6 demonstrates the long wave pass filter and short wave pass filter combination that is used in the filter array detector.

As shown in FIG. 6, filter 310 for target detector array 220 of FIG. 2 is designed with a long wave pass band filter A (LWP) and a short wave pass band filter B (SWP) combination. The required band width is so small that there are problems in depositing coatings for a narrow pass band filter. The problem of a narrow pass band filter is solved by overlapping SWP and LWP filters. FIG. 6 demonstrates a SWP filter B that cuts off at 4.3 μm and a LWP filter A that cuts on at 4.2 μm and does provide a good transmission notch. It should be noted that FIG. 6 shows the transmittance of each filter independently. Therefore, the actual transmittance in the notch would have to be obtained by multiplying the transmittances of the two filters. Each of these two filters would require many layers perhaps 15, or more, depending on which materials are used.

The most likely materials to use for filters such as this are ZnSe, ZnS, Ge, PbTe, $CaF_2$, $PbF_2$ and $SrF_2$. There are a number of other materials that could also be used. The final choice of materials is based upon the following considerations:

Use materials with a high index contrast to limit the number of layers required.

Use materials that deposit with minimal stress and/or with stresses that are nearly equal and opposite (tensile and compressive) so the net stress in a stack will be low.

Use materials with thermal expansion coefficients (TEC) that match each other and that of the substrate.

Use materials with low in-band absorption.

Depending on the final location of the filters it could also be necessary to use materials that are not hygroscopic. With all these important properties to consider, the final choices obviously will be selected after a trade-off analysis.

Both filters 310 for guard band array 210 and target detect array 220 for the preferred embodiment are purchased from Optical Coating Laboratories, Inc., Santa Rosa, Calif.

The invention is capable of operation with the sun in the field of view due to the combination of both a target detector array 220 and a guard band array 210. Filter 310 for guard band array 210 passes energy over the spectral band of 1 μm to 4 μm and consequently the detector is sensitive to the presence of either a flare or the sun. This is because the peak of the broad band solar and flare radiant emittance is near the pass band of filter 310 for guard band array 210. The ratio of the sun's energy incident on the detector in the guard band wave length is 1,000 times the energy from the sun on the target detector array 220. On the other hand, when the arrays are scanned across the jet plume radiance there is much less energy incident on the array in the guard band filter region than over the narrow $CO_2$ band filter region. Consequently, jet plume radiation can be discriminated from false targets such as the sun, flares, and background clutter by standard two color techniques. This processing is accomplished utilizing CPU 20 of FIG. 1. The CPU 20 computes the ratio from the target detector array and the guard band array. A valid target will have a high ratio of energy from the target in the target detector band 4.2 μm to 4.3 μm to energy on the guard band array 210. Conversely, a false target will have a low ratio of energy on the target detector array 220 to energy on the guard band array 210. If a gray body clutter source has high enough radiance to exceed the threshold set for the target detector array 220 then the energy collected from that clutter background source will be much higher in the guard band array wave length from 1 μm to 4 μm, and consequently, background clutter will be rejected in the same manner as the sun and countermeasure flares. The only background clutter objects that could have enough energy to exceed the threshold on the target detection array are assumed to be specular glints from the sun off the water and other specular surfaces.

The cooling requirements for the detector system dictate that the detector reach an operating temperature of 250° Kelvin within two seconds of activation over a flight duration of ten seconds. The rapid cool down of the relatively large thermal load of the dual array system can be met by a Joule-Thompson type cooling unit.

Figure 7:
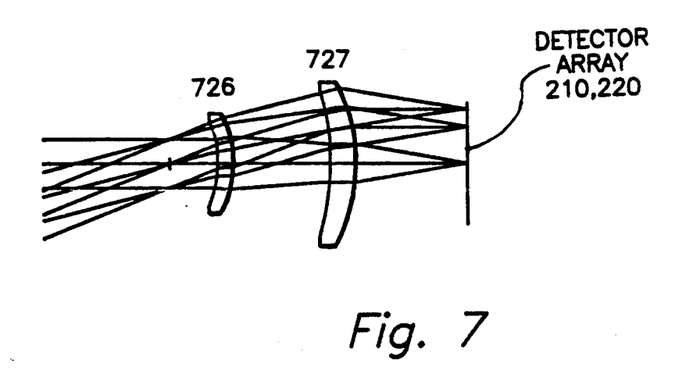
FIG. 7 illustrates the optics utilized by the sensor.
Figure 8:
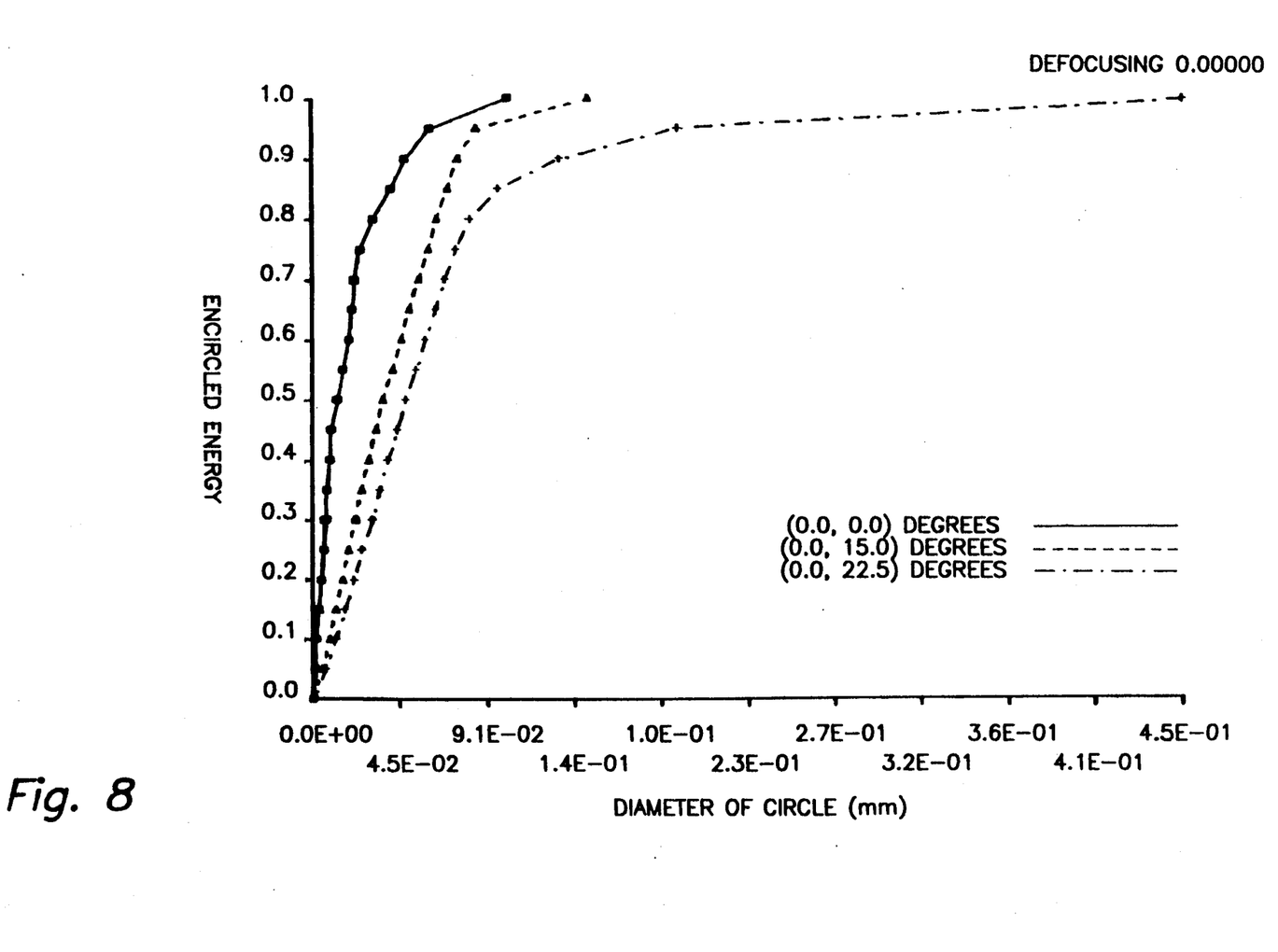
FIG. 8 illustrates the encircled energy for three field points for the optical elements.

The optical design approach of the preferred embodiment was driven by a desire for low cost and the overall system length requirement. This system consists of only two elements, a first positive meniscus lens 727 and a second positive meniscus lens 726. The back surface of both elements have a diffractive profile. A thin layer of IR plastic would be deposited onto the element surface and the diffractive profile replicated into it by a master. Diffractive surfaces with a 4-step profile have efficiencies in the 96% range. The encircled energy for three field points is shown in FIG. 8. The 80% encircled energy diameter for the full field is 0.1 millimeter, which corresponds to 2 milliradians. This system's F/# is F/2.8.

Optical requirements are design driven by the narrow filter band width, flat focal plane, and short path length. The telecentric optical design of FIG. 7 with two positive spherical meniscus lenses 726 and 727 and a binary micro lens optics 325 satisfies all requirements and design drivers. The back surface of each spherical optical element has an aspheric binary profile and a separate binary micro lens array 325 is located in front of each detector array as shown in FIG. 3. The micro lens array 325 increases the effective focal plane fill factor, reduces detector noise and permits the use of a smaller aperture and optical path length. The telecentric optical form is the preferred approach in this design since it provides small incident angles which is required for narrow band interference filters. The telecentric design also has a flat focal plane which permits the use of a low cost focal plane array. Binary coatings on the optical spherical surfaces are used as a cost effective substitute for aspheric lens. The prescriptions for the two positive spherical meniscus lenses 726 and 727 are given in Appendix A. The information in Appendix A is in Code V.

APPENDIX A

CODE V
HELO F/2.8

| OBJ: | RDY<br>INFINITY | | THI<br>INFINITY | RMD | GLA | CCY<br>100 | THC<br>100 | GLC |
|---|---|---|---|---|---|---|---|---|
| | | | LENS 726 | | | | | |
| STO: | 51.51530 | | 6.000000 | | SILICN_SPECIAL | 0 | 100 | |
| 2: | 60.11660 | | 31.172470 | | AIR | | 0 | |
| HOE: | | | | | | | | |
| HV1: | REA | HV2: | REA | HOR: | 1 | | | |
| HX1: | 0.000000E + 00 | HY1: | 0.000000E + 00 | HZ1: | 0.100000E + 21 | | | |
| CX1: | 100 | CY1: | 100 | CZ1: | 100 | | | |
| HX2: | 0.000000E + 00 | HY2: | 0.000000E + 00 | HZ2: | 0.100000E + 21 | | | |
| CX2: | 100 | CY2: | 100 | CZ2: | 100 | | | |
| HWL: | 2500.00 | HTO: | SPH | HNO: | 27 | | | |
| HCO/HCC | | | | | | | | |
| C3: | −2.6318E−04 | C5: | −2.6318E−04 | C10: | 4.2105E−07 | | | |
| C3: | 0 | C5: | 0 | C10: | 0 | | | |
| C12: | 8.4209E−07 | C14: | 4.2105E−07 | C21: | 1.3465E−09 | | | |
| C12: | 0 | C14: | 0 | C21: | 0 | | | |
| C23: | 4.0394E−09 | C25: | 4.0394E−09 | C27: | 1.3465E−09 | | | |
| C23: | 0 | C25: | 0 | C27: | 0 | | | |
| | | | LENS 727 | | | | | |
| 3: | 145.89976 | | 6.000000 | | SILICN_SPECIAL | 0 | 100 | |
| 4: | 363.87441 | | −58.268429 | | | 0 | 0 | |
| HOE: | | | | | | | | |
| HV1: | REA | HV2: | REA | HOR: | 1 | | | |
| HX1: | 0.000000E + 00 | HY1: | 0.000000E + 00 | HZ1: | 0.100000E + 21 | | | |
| CX1: | 100 | CY1: | 100 | CZ1: | 100 | | | |
| HX2: | 0.000000E + 00 | HY2: | 0.000000E + 00 | HZ2: | 0.100000E + 21 | | | |
| CX2: | 100 | CY2: | 100 | CZ2: | 100 | | | |
| HWL: | 2500.00 | HTO: | SPH | HNO: | 27 | | | |
| HCO/HCC | | | | | | | | |
| C3: | −6.5348E−04 | C5: | −6.5348E−04 | C10: | 6.6769E−07 | | | |
| C3: | 0 | C5: | 0 | C10: | 0 | | | |
| C12: | 1.3354E−06 | C14: | 6.6769E−07 | C21: | 2.1846E−09 | | | |
| C12: | 0 | C14: | 0 | C21: | 0 | | | |
| C23: | 6.5537E−09 | C25: | 6.5537E−09 | C27: | 2.1846E−09 | | | |
| C23: | 0 | C25: | 0 | C27: | 0 | | | |
| 5: | INFINITY | | 90.095958 | | | 100 | 0 | |
| IMG: | −90.09567 | | 0.000000 | | | 0 | 100 | |

SPECIFICATION DATA
EPD     20.00000
DIM     MM
WL      2400.00       2200.00       2000.00
REF     2

-continued

APPENDIX A

| | | | |
|---|---|---|---|
| WTW | 1 | 1 | 1 |
| INI | BSF | | |
| XAN | 0.00000 | 0.00000 | 0.00000 |
| YAN | 0.00000 | 15.00000 | 22.50000 |
| VUX | 0.00000 | 0.00000 | 0.00000 |
| VLX | 0.00000 | 0.00000 | 0.00000 |
| VUY | 0.00000 | 0.00000 | 0.00000 |
| VLY | 0.00000 | 0.00000 | 0.00000 |
| APERTURE DATA/EDGE DEFINITIONS | | | |
| CA | | | |
| CIR S1 | 10.000000 | | |
| REFRACTIVE INDICES | | | |
| GLASS CODE | 2400.00 | 2200.00 | 2000.00 |
| SILICN_SPECIAL | 3.441408 | 3.446254 | 3.452672 |

No solves in defined in system
This is a decentered system. If elements with power are decentered or tilted, the first order properties are probably inadequate in describing the system characteristics.

| INFINITE CONJUGATES | |
|---|---|
| EFL | 60.8713 |
| BFL | 92.6879 |
| FFL | −44.0541 |
| FNO | 3.0436 |
| IMG DIS | 90.0960 |
| OAL | −15.0960 |
| PARAXIAL IMAGE HT | 25.2137 |
| ANG | 22.5000 |
| ENTRANCE PUPIL DIA | 20.0000 |
| THI | 0.0000 |
| EXIT PUPIL DIA | 27.6348 |
| THI | 8.5797 |

CODE V CONVERSION TABLE

Coefficients for describing "aspheric" phase departure from pure 2-point construction configuration for HOE type surface Sk, using a polynomial in X, Y on the surface of the substrate. Evaluation of the polynomial gives the OPD (in lens units, at the construction wavelength HWL) to be added to the aberrations of the 2-point HOE. These coefficients are normally the result of an AUTOMATIC DESIGN run in which they are varied, rather than user defined. Coefficients are for monomials in ascending order up to 10th order, starting with the 1st order:

| | | | |
|---|---|---|---|
| C1 | X | C21 | $X^6$ |
| C2 | Y | : | : |
| C3 | $X^2$ | C27 | $Y^6$ |
| C4 | XY | C28 | $X^7$ |
| C5 | $Y^2$ | : | : |
| C6 | $X^3$ | C35 | $Y^7$ |
| C7 | $X^2Y$ | C36 | $X^8$ |
| C8 | $XY^2$ | : | : |
| C9 | $Y^3$ | C44 | $Y^8$ |
| C10 | $X^4$ | C45 | $X^9$ |
| C11 | $X^3Y$ | : | : |
| C12 | $X^2Y^2$ | C54 | $Y^9$ |
| C13 | $XY^3$ | C55 | $X^{10}$ |
| C14 | $Y^4$ | : | : |
| C15 | $X^5$ | C65 | $Y^{10}$ |
| : | : | | |
| C20 | $Y^5$ | | |

The term j can be calculated from: $J = \{(m + n)2 + m + 3n\}/2$ where m, n are the powers of X, Y respectively; j must not exceed 65. See HNO for a way to "turn off" coefficients from being included in the polynomial.

We claim:

1. An infrared sensor for short range detection of vehicles, said sensor able to detect vehicles with sun in said sensor's field of view, said sensor being operated upon a spinning platform wherein said spinning platform has precessional motion, said sensor comprising:
   a) first detector sensitive to radiation in a first predetermined frequency band;
   b) second detector sensitive to radiation in a second predetermined frequency band, said second detector tracking a radiation signal if said radiation signal is below a threshold in said first predetermined frequency band; and
   c) objective lens to focus said radiation on said first and said second detector.

2. The sensor of claim 1 wherein said second predetermined frequency band is the $CO_2$ absorption band.

3. The sensor of claim 2 wherein said first predetermined frequency band is below said second predetermined frequency band.

4. The sensor of claim 2 wherein said second predetermined frequency band is 4.3 μm.

5. The sensor of claim 4 wherein said first predetermined frequency band is 1.0 μm to 4 μm.

6. The sensor of claim 1 wherein said first detector is mounted on the same plane as said second detector.

7. The sensor of claim 1 wherein said first predetermined frequency band is 1.0 μm to 4 μm.

8. The sensor of claim 1 wherein said first detector and said second detector comprise:
   a) detector means to detect said radiation;
   b) filter means to filter said radiation; and
   c) binary micro lens to focus said radiation onto said detector.

9. The sensor of claim 1 wherein said objective lens comprises:
   a) first positive meniscus lens having a diffractive profile; and
   b) second positive meniscus lens having a diffractive profile, wherein said first positive meniscus lens and said second positive meniscus lens in combination focus said radiation upon said first detector an said second detector.

10. The sensor of claim 9 wherein said first detector and said second detector comprise:
    a) detector means to detect said radiation;
    b) filter means to filter said radiation; and
    c) binary micro lens to focus said radiation onto said detector.

11. An infrared sensor for short range detection of vehicles, said sensor having a radiation source occasionally in said sensor's field of regard, said sensor comprising:
    a) first detector sensitive to radiation produced by said radiation source;
    b) second detector sensitive to radiation produced by said vehicle;
    c) spinning platform, said first and said second detector being mounted to said platform; and
    d) central processing unit for processing said first an said second sensor's detections, said central processing unit tracking said second detector's detected signal if said detected signal is absent from said first detector.

12. The sensor of claim 11 wherein said radiation source includes the sun.

13. The sensor of claim 12 wherein said first detector and said second detector comprise:
    a) detector means to detect said radiation;
    b) filter means to filter said radiation; and
    c) binary micro lens to focus said radiation onto said detector.

14. The sensor of claim 11 wherein said radiation source is present in a first predetermined frequency band from 1.0 μm to 4 μm.

15. The sensor of claim 14 wherein said radiation produced by said vehicle is present at a second predetermined frequency band of 4.3 μm.

* * * * *

UNITED STATES PATENT AND TRADEMARK OFFICE
CERTIFICATE OF CORRECTION

PATENT NO. : 5,093,574
DATED : Mar. 3, 1992
INVENTOR(S) : Patrick D. Pratt and Douglas B. Pledger It is certified that error appears in the above-indentified patent and that said Letters Patent is hereby corrected as shown below:

Column 9, line 20, cancel "an" and substitute --and--.

Column 10, line 9, cancel "an" and substitute --and--.

Signed and Sealed this

Twenty-fifth Day of October, 1994

Attest:

BRUCE LEHMAN

*Attesting Officer*    *Commissioner of Patents and Trademarks*